June 19, 1951  J. AICARDI  2,557,855
RADIO GUIDING SYSTEM
Filed Jan. 17, 1949
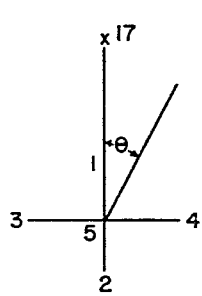
Fig 1
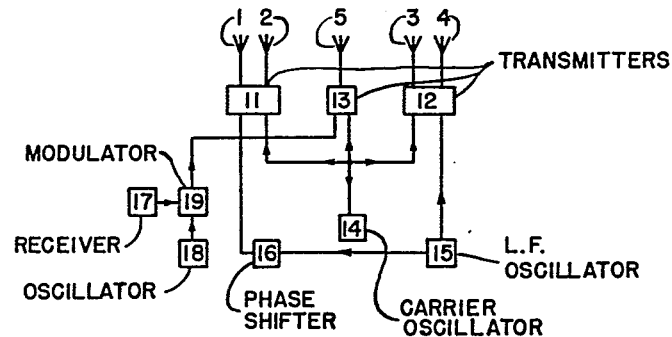
Fig 2
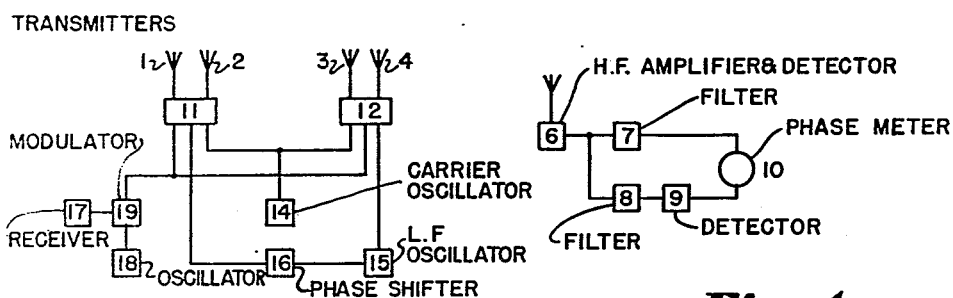
Fig 3
Fig 4
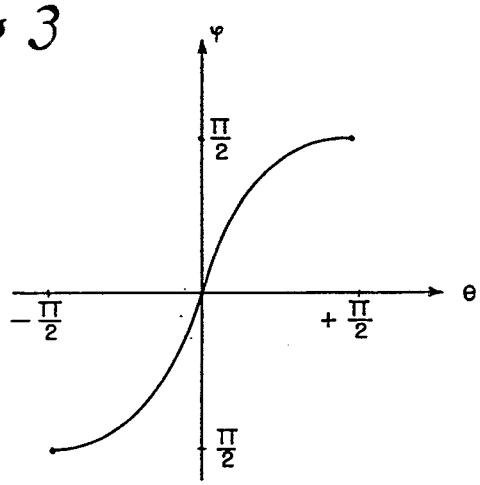
Fig 5
INVENTOR
JOSEPH AICARDI
BY
ATTORNEY Patented June 19, 1951

2,557,855

UNITED STATES PATENT OFFICE 2,557,855

RADIO GUIDING SYSTEM

Joseph Aicardi, Versailles, France, assignor to Societe francaise Sadir-Carpentier, Paris, France, a corporation of France Application January 17, 1949, Serial No. 71,329
In France January 26, 1948

3 Claims. (Cl. 343—107)

The present invention has for its object a radio-guiding system, more particularly intended for the execution of a radio-guiding axis that is defined by the measure of a phase difference between two low frequency voltages received at the output of a receiver equipped with an ordinary aerial.

Various systems have already been proposed for producing a guiding axis in accordance with the above disclosed principle; but in the known methods applied heretofore the variation in phase that is measured is equal to or of the same order of magnitude as the variation in bearing producing it.

Consequently any error or uncertainty in the measure of the low frequency phase leads to an error of same magnitude for the measure of the bearing. Now it is obviously of interest to provide an indication as accurate as possible of the bearing.

This forms the main object of the invention that consists now in producing a radio-electric field such that in the vicinity of the direction of the marked out axis, any variation in the bearing of the receiver with reference to the transmitter leads to a variation in the measured low frequency phase that is much larger, that is said variation is multiplied by a factor $n$ equal for instance to 10 whereby the accuracy of the measure of the bearing is multiplied by said factor $n$.

According to the invention, this result is achieved by using two frame antennas or two systems of Adcock antennas having the same center and the planes of which are perpendicular to one another.

One of the frame antennas transmits high frequency waves that are modulated by a comparatively weak low frequency and the other frame antenna transmits waves at the same high frequency modulated at the same low frequency, the modulating voltages of the two frame antennas being perpendicular to one another and the high frequency voltages being in phase.

It is readily apparent that the combination of the fields of these two frames produces a resulting field at the receiver station the phase of modulation of which $\varphi$ is a function of the azimuth $\beta$ of the receiver station.

Furthermore, in the vicinity of the marked out axis, the variation of $\varphi$ as a function of $\theta$ is considerable, in other words in the case of such a vicinity, the following equality is true as disclosed hereinabove $\varphi = n\theta$, $n$ being for instance equal to 10. Lastly an auxiliary preferably omnidirectional aerial transmits a wave at the same high frequency as the frame antenna frequency; this wave is modulated by an auxiliary frequency F that is in its turn modulated by a modulating voltage at the same low frequency as that modulating the two frame aerials considered; this modulating tension serves for defining a reference phase, the comparison of which with the phase of the above mentioned resulting field provides the value of the phase difference $\varphi$ which provides in its turn the value of the azimuth $\beta$.

The invention will now be disclosed with further details and further features will be disclosed hereinafter with reference to accompanying drawings; in said drawings, Fig. 1 shows the arrangement of the aerials on the ground.

Fig. 2 shows an embodiment of the means for the feeding of said aerials.

Fig. 3 illustrates a further embodiment of said feeding means.

Fig. 4 is a diagram of the receiving station.

Fig. 5 is an explanatory diagram.

According to the invention, there are used preferably two aerial systems perpendicular to one another and having the same center, to wit: the aerials 1—2 constituted for instance by vertical dipoles or doublet antennas, said two antennas being replaced if required by a frame antenna, and a second pair of antennas 3—4, the plane of which is perpendicular to that of the antennas 1—2. The antenna systems 1—2—3—4 have the same center. The antennas 1—2 are fed by currents in phase opposition, the shape of which is: $I_1 = \pm A \sin wt(1 + k \sin pt)$ $w$ being $2\pi$ times the frequency of the high frequency waves and $p$ being $2\pi$ times the frequency of the modulating voltage.

Similarly, the currents passing through the antennas 3 and 4 are in phase opposition and assume a shape:

$$I_2 = \mp B \sin wt(1 + K' \cos pt)$$

The marked out axis is aligned with the line 1—2 and the spacing between the antennas 3 and 4 is preferably larger than that between the antennas 1 and 2 for instance. It is possible to take for the distance 1—2 a value equal to $\lambda/4$ and for the distance 3—4, a distance equal to $2\lambda/3$, $\lambda$ being the wavelength of the high frequency transmitted. Supposing $d$ is the distance between the aerials 1 and 2 and D that between the aerials 3 and 4, calculation shows that in the direction forming an angle $\beta$ with the line 1—2, the field of the aerials 1—2 has for its value:

$$KA \cos wt \sin \frac{2\pi d}{\lambda} \cos \alpha (1 + k \sin pt)$$

whereas the field of the aerials 3—4 has for its value $$KB \cos wt \sin \frac{2\pi d}{\lambda} \sin \theta (1 + k' \cos pt)$$

$\lambda$ being the wavelength of the high frequency waves transmitted, and $k$ and $k'$ being the amplitudes of modulation. Consequently the total field of these four aerials is given by the expression:

$$M \cos wt(a + \sin(pt + \varphi))$$

whereby the receiver produces a low frequency current having as a phase $\varphi$ and the following equation holds true:

$$tg\varphi = \frac{k'}{k} \frac{B}{A} \frac{\sin\left(\frac{2\pi D}{\lambda} \sin\theta\right)}{\sin\left(2\pi\frac{d}{\lambda} \cos\theta\right)}$$

In the vicinity of the axis, that is when $\theta$ is very small a derivation of this formula gives approximately, the value of the factor $n$ as follows:

$$n = \frac{d\varphi}{d\theta} = \frac{k'}{k} \frac{B}{A} \frac{\frac{2\pi D}{\lambda}}{\sin\frac{2\pi d}{\lambda}}$$

This formula shows that for a predetermined value of the ratio $k'/k$ between the two rates of modulation, and of the ratio $b/a$ between the field intensities in the two pairs of aerials, the value of $n$ is all the higher when $D/\lambda$ is higher and $d/\lambda$ smaller.

On the other hand, the range in the direction of the axis is reduced when $d/\lambda$ is smaller as readily apparent, whereby the value selected for $d/\lambda$ is a matter of compromise. The same is the case for the value of $D/\lambda$ at least if it is desired for $\varphi$ to vary always in the same sense as a function of $\theta$. Such considerations leads for instance to the above mentioned values $$d = \frac{\lambda}{4}$$

and $$D = \frac{2\lambda}{3}$$

It will be noticed that in a direction perpendicular to the axis, the phase $\varphi$ is equal to $$\frac{\pi}{2}$$

Fig. 5 illustrates the variations of $\varphi$ as a function of $\theta$.

Lastly the aerial 5, located for instance at the common center of the aerials 1—2—3—4, transmits waves having a period $w$ that are modulated by the intermediate frequency F which latter is modulated in its turn by a voltage at a period $p$; the phase of this modulation is taken as the origin of the phases or reference phase.

At the receiver illustrated in Fig. 4, after amplification of the high frequency by the amplifier 6 and a first detection, the voltage obtained feeds a filter 7 that allows the passage of the oscillations having the period $p$; there is collected at the output of the filter a current of the shape $\sin(pt - \varphi)$. On the other hand, the high frequency amplifier 6 feeds a second filter 8 that is tuned to the intermediate frequency F. Said filter is followed by a second detector 9 producing a current having a period of oscillation $p$ giving the reference phase. The phasemeter 10 receives the current from the filter 7 and from the detector 9 and measures their difference in phase, $\varphi$ from which the value of the azimuth $\theta$ may be obtained. In fact, the phasemeter may be provided with a scale of azimuths so as to allow reading the latter directly.

It is apparent that the receiver is a quite conventional set incorporating only well-known parts. Fig. 2 illustrates a transmitter arrangement for feeding the five aerials 1, 2, 3, 4 and 5 of Fig. 1, the transmitter 11 feeding the two aerials 1 and 2, the transmitter 12 feeding the aerials 3 and 4 and the transmitter 13 feeding the last aerial 5. The oscillator 14 provides the high frequency carrier with a period $w$ that is sent directly to the three transmitters. A low frequency oscillator 15 having as a period $p$ feeds the transmitter 12 directly and the transmitter 11 through the agency of the phase-shifter 16 that introduces a phase shift of $\pi/2$ whereby the transmitters 11 and 12 generate the desired modulated currents.

According to a feature of the invention, the modulating voltage to be provided for the transmitter 13 of the aerial 5 is obtained through a local receiver arranged preferably on the axis 1—2, Fig. 1. This method defines a radio axis having a constant direction independent of any lack of balance between the means feeding the different aerials as well as of any variations in phase in the high frequency currents passing through said aerial. Said receiver 17 (Figs. 1 and 2) provides across its terminals the modulating voltage having the period $p$ obtained from the field of the aerials 1—2—3—4 which voltage is sent back through wires to the transmitter where it serves for the modulation of an auxiliary wave at an intermediate frequency F generated by the oscillator 18, said modulation being performed in the modulator 19. The modulated voltage passing out of the modulator 19 is fed to the transmitter 13 for partly amplitude modulating therein the high frequency waves having a period $w$ fed by the oscillator 14.

According to a further feature of the invention and in order to provide for complete independence at the receiver station between the detecting waves having a period $p$ and fed by the aerials 1—2—3—4 on one hand and 5 on the other, the modulation produced by the modulator 19 is preferably a frequency modulation; in this case of course, the detector 9 of the receiver operates as a discriminator demodulating said frequency-modulated waves transmitted by the aerial 5.

Fig. 3 illustrates a modified embodiment allowing the aerial 5 to be cut out. The aerials 1—2—3—4 are retained and are fed as hereinabove by transmitters 11—12 through the parts 14—15—16. The elements 17—18—19 are again present as hereinabove and play the same parts; but in this case, the modulating voltage from 19 serves for modulating both high frequency waves transmitted through the transmitters 11 and 12. The operation will be readily understood through the above disclosure.

Obviously many details may be modified in the above described embodiments without widening thereby the scope of the present invention as defined in accompanying claims.

What I claim is:

1. A radio beacon comprising four aerials distributed at short distances from a center point that are equal in each of two perpendicular directions and forming two groups at right angles with one another, radio transmitter apparatus connected to said four aerials to transmit in two perpendicular planes high frequency waves in phase with one another, the distances between the said aerials of cooperating groups being substantially equal respectively to one quarter and two thirds of a wavelength, means for modulating said high frequency waves with low frequency waves of the same frequency but to different amplitudes, the low frequency modulating one group of said aerials being 90 degrees out of phase with that modulating the other group, a complementary aerial located substantially at the center point of said four aerials and means for transmitting waves of the same high frequency as the preceding waves from said complementary aerial, means for modulating an intermediate frequency with waves of the same low frequency and means for modulating the last mentioned high frequency waves with said modulated intermediate frequency, the relative phase of said last mentioned low frequency modulation being such as to define when in phase with the low frequency modulation of the first mentioned high frequency waves a bearing that is in substantial alignment with the aerials of the group of aerials that are one quarter of a wavelength apart.

2. A radio beacon comprising four aerials distributed at short distances from a center point that are equal in each of two perpendicular directions and forming two groups at right angles with one another, radio transmitter apparatus connected to said four aerials to transmit in two perpendicular planes high frequency waves in phase with one another, the distances between the said aerials of cooperating groups being substantially equal respectively to one quarter and two thirds of a wavelength, means for modulating said high frequency waves with low frequency waves of the same frequency but to different amplitudes, the low frequency modulating one group of said aerials being 90 degrees out of phase with that modulating the other group, a complementary aerial located substantially at the center point of said four first aerials, means for transmitting waves of the same high frequency as the preceding waves from said complementary aerial, a receiver for receiving and detecting the low frequency modulation of said first mentioned high frequency waves, an intermediate frequency oscillator, means for modulating said intermediate frequency oscillator with said detected modulation, and means for modulating the last mentioned means for transmitting with said modulated intermediate frequency oscillations, the relative phase of said last mentioned low frequency modulation being such as to define when in phase with the low frequency modulation of the first mentioned high frequency waves a bearing that is in substantial alignment with the aerials of the group of aerials that are one quarter of a wavelength apart.

3. A radio beacon comprising four aerials distributed at short distances from a center point that are equal in each of two perpendicular directions and forming two groups at right angles with one another, radio transmitter apparatus connected to said four aerials to transmit in two perpendicular planes high frequency waves in phase with one another, the distances between the said aerials of cooperating groups being substantially equal respectively to one quarter and two thirds of a wavelength, means for modulating said high frequency waves with low frequency waves of the same frequency but to different amplitudes, the low frequency modulating one group of said aerials being 90 degrees out of phase with that modulating the other group, a complementary aerial located substantially at the center point of said four aerials and means for transmitting waves of the same high frequency as the preceding waves from said complementary aerial, means for modulating an intermediate frequency with waves of the same low frequency and means for modulating the last mentioned high frequency waves with said modulated intermediate frequency, means for receiving said high frequency waves, and means for indicating when said last mentioned low frequency modulation is in phase with the resulting modulation of the first mentioned high frequency waves to indicate that said receiver is in a predetermined direction from the radio beacon.

JOSEPH AICARDI.

REFERENCES CITED

The following references are of record in the file of this patent:

UNITED STATES PATENTS

| Number | Name | Date |
| --- | --- | --- |
| 2,129,004 | Greig | Sept. 6, 1938 |
| 2,190,037 | Neufeld | Feb. 13, 1940 |
| 2,253,958 | Luck | Aug. 26, 1941 |
| 2,377,902 | Relson | June 12, 1945 |
| 2,422,110 | Luck | June 10, 1947 |
| 2,430,244 | O'Brien | Nov. 4, 1947 |